United States Patent [19]
Iizuka

[11] Patent Number: 5,303,615
[45] Date of Patent: Apr. 19, 1994

[54] LINE PRESSURE CONTROL OF AUTOMATIC TRANSMISSION

[75] Inventor: Naonori Iizuka, Shizuoka, Japan

[73] Assignee: Jatco Corporation, Japan

[21] Appl. No.: 32,568

[22] Filed: Mar. 18, 1993

Related U.S. Application Data

[63] Continuation of Ser. No. 711,318, Jun. 6, 1991, abandoned.

[30] Foreign Application Priority Data

Jun. 8, 1990 [JP] Japan .................................. 2-150755

[51] Int. Cl.$^5$ ............................................. F16H 5/60
[52] U.S. Cl. ................................................... 74/866
[58] Field of Search ....................... 74/866; 364/424.1

[56] References Cited

U.S. PATENT DOCUMENTS

| | | | |
|---|---|---|---|
| 4,730,521 | 3/1988 | Hayasaki et al. | 74/867 |
| 4,807,496 | 2/1989 | Hayasaki et al. | 74/866 |
| 4,870,581 | 9/1989 | Ito et al. | 364/424.1 |
| 4,905,545 | 3/1990 | Leising et al. | 74/867 X |
| 4,939,957 | 7/1990 | Asano et al. | 74/866 |
| 4,955,259 | 9/1990 | Narita | 74/866 |
| 5,014,575 | 5/1991 | Fujiwara et al. | 74/866 |
| 5,014,576 | 5/1991 | Yamaguchi | 74/866 |
| 5,083,480 | 1/1992 | Abo et al. | 364/424.1 X |
| 5,107,723 | 4/1992 | Yamashita et al. | 74/866 |
| 5,213,013 | 5/1993 | Fujiwara et al. | 74/866 |

FOREIGN PATENT DOCUMENTS

| | | |
|---|---|---|
| 2929729C2 | 9/1985 | Fed. Rep. of Germany . |
| 61-130652 | 6/1986 | Japan . |
| 63-251652 | 10/1988 | Japan . |

OTHER PUBLICATIONS

English Language Translation of German Office Action Aug. 25, 1992.

Primary Examiner—Leslie A. Braun
Assistant Examiner—Khoi Q. Ta
Attorney, Agent, or Firm—Ronald P. Kananen

[57] ABSTRACT

There is disclosed a line pressure control for an automatic transmission of an automotive vehicle wherein the automatic transmission is drivingly coupled with the engine and transmits the engine torque by a hydraulically actuable coupling which is actuable by a pressurized hydraulic fluid which is as high as the line pressure. According to this control, a predetermined pattern of variation of the pressurized hydraulic fluid is changed to a second pattern upon detecting the occurrence of a change in an engine load beyond a predetermined degree, and the pressurized hydraulic fluid follows the second pattern temporarily, i.e., for a period of time.

6 Claims, 6 Drawing Sheets

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. SPEED | | | ○ | | | | ○ | ○ | $\dfrac{1+\alpha_2}{\alpha_2}$ | 3.027 |
| | 2ND. SPEED | | ○ | ○ | | ○ | | ○ | | $\dfrac{\alpha_1+\alpha_2+\alpha_1\alpha_2}{\alpha_2(1+\alpha_1)}$ | 1.619 |
| | 3RD. SPEED | | ○ | ○ | ○ | | | ○ | | 1 | 1.000 |
| | 4TH. SPEED | | | (○) | ○ | ○ | | | | $\dfrac{1}{1+\alpha_1}$ | 0.694 |
| ENGINE BRAKE RUNNING STATE | 1ST. SPEED | | | (○) | | | ○ | (○) | (○) | | |
| | 2ND. SPEED | | ○ | (○) | ○ | | | (○) | | | |
| | 3RD. SPEED | | ○ | (○) | ○ | ○ | | (○) | | | |
| | 4TH. SPEED | | | (○) | ○ | ○ | | | | | |
| REVERSE | | ○ | | | | | ○ | | | $-\dfrac{1}{\alpha_1}$ | -2.272 |

( ) UNRELATED TO POWER TRANSMISSION

LINE PRESSURE CONTROL OF AUTOMATIC TRANSMISSION

This application is a continuation of application Ser. No. 07/711,318 filed Jun. 6, 1991, abandoned.

BACKGROUND OF THE INVENTION

The present invention relates to a method of and a system for controlling a pressurized hydraulic fluid supplied to hydraulically actuable torque transmitting couplings in an automatic transmission of an automotive vehicle.

Japanese Patent Application First (unexamined) Publication No. 61-130652 or U.S. Pat. No. 4,807,496 discloses an automatic transmission in which a line pressure solenoid is provided to generate a solenoid pressure which is supplied to a pressure modifier valve. The pressure modifier valve generates a modifier pressure in response to the solenoid pressure. This modifier pressure is supplied to a pressure regulator valve where the pressure regulation is effected on the modifier pressure to generate a line pressure which is supplied to hydraulically actuable torque transmitting couplings of the automatic transmission. According to the above-mentioned Japanese Patent Application First publication, the line pressure solenoid is controlled such that the line pressure varies in accordance with a predetermined pattern in response to an engine load in terms of a throttle opening degree. The line pressure versus throttle opening degree characteristic is designed to follow a torque versus throttle opening degree characteristic of an engine with which the automatic transmission is to be coupled. However, a change in engine torque due to a change in throttle opening degree is sluggish as compared to a quick change in line pressure due to the change in throttle opening degree. If the line pressure is too low during the transition phase, there occurs a slip in the hydraulically actuable couplings. If the line pressure is too high during the transition phase, there occurs a substantial shift shock on kickdown operation.

An object of the present invention is to improve the control of the above-mentioned kind such that the line pressure can follow well with an actual variation in engine torque upon occurrence of a change in load imposed on the engine, thus eliminating any slip or substantial shift shock on a kickdown operation.

SUMMARY OF THE INVENTION

According to one aspect of the present invention, there is provided a method of controlling an automatic transmission of an automotive vehicle having an engine with an engine load sensor for generating an engine load indicative signal indicative of a load on the engine, wherein the automatic transmission is drivingly coupled with the engine and transmits the engine torque by a hydraulically actuable coupling which is actuable by a pressurized hydraulic fluid, the method comprising the steps of:

varying the pressurized hydraulic fluid in a predetermined pattern in response to the engine load indicative signal;

detecting occurrence of a change in the engine load indicative signal beyond a predetermined degree; and changing the predetermined pattern of variation to a second pattern upon detecting the occurrence of the change in the engine load indicative signal beyond the predetermined degree and causing the pressurized hydraulic fluid to follow the second pattern for a period of time.

According to another aspect of the present invention, there is provided a system for controlling an automatic transmission of an automotive vehicle having an engine with an engine load sensor for generating an engine load indicative signal indicative of a load on the engine, wherein the automatic transmission is drivingly coupled with the engine and transmits the engine torque by a hydraulically actuable coupling which is actuable by a pressurized hydraulic fluid, the system comprising:

means for varying the pressurized hydraulic fluid in a predetermined pattern in response to the engine load indicative signal;

means for detecting occurrence of a change in the engine load indicative signal beyond a predetermined degree; and means for changing the predetermined pattern of variation to a second pattern upon detecting the occurrence of the change in the engine load indicative signal beyond the predetermined degree and causing the pressurized hydraulic fluid to follow said second pattern for a period of time.

DETAILED DESCRIPTION OF THE INVENTION

Figure 1:
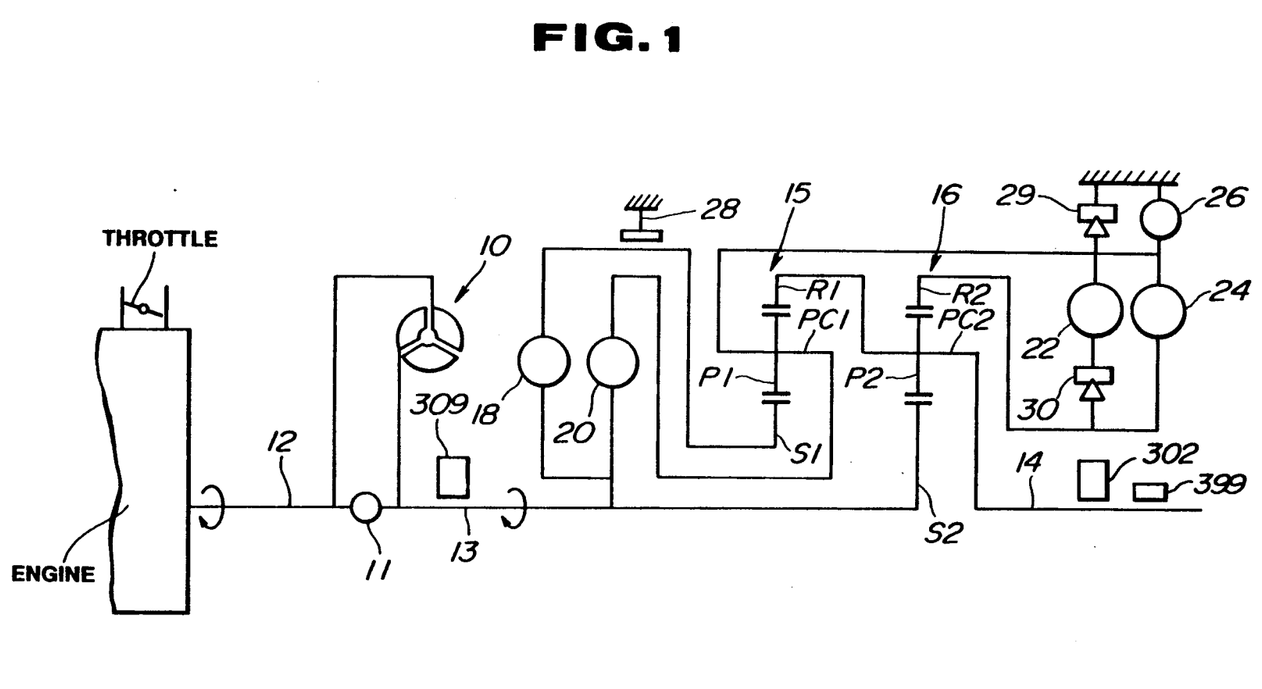
FIG. 1 is a schematic diagram of an automatic stepwise operable transmission coupled with an engine of an automotive vehicle.

Referring to FIG. 1, an automatic stepwise operable transmission is drivingly coupled with a torque converter 10 which is in turn drivingly coupled with an output shaft 12 of an engine of an automotive vehicle. The engine has a throttle valve which opens in degrees. The automatic transmission provides four forward speeds with an overdrive and a single reverse. The transmission includes an input shaft 13 connected to a turbine runner of the torque converter 10, and an output shaft 14 connected to a final drive gear assebly, not illustrated. It also includes a first planetary gear set 15, a second planetary gear set 16, a reverse clutch 18, a high clutch 20, a forward clutch 22, an overrunning clutch 24, a low & reverse brake 26, a band brake 28, a low one-way clutch 29, and a forward one-way clutch 30. The torque converter 10 includes therein a lock-up clutch 11. The first planetary gear set 15 comprises a sun gear S1, a ring gear R1, and a pinion carrier PC1 rotatably supporting pinion gears P1, each meshing both the sun and ring gears S1 and R1. The planetary gear set 16 comprises a sun gear S2, a ring gear R2, and a pinion carrier PC2 rotatably supporting pinion gears P2, each meshing both the sun and ring gears S2 and R2. The carrier PC1 is connectable to the input shaft 13 via the high clutch 20, while the sun gear S1 is connectable to the input shaft 13 via the reverse clutch 18. The carrier PC1 is connectable to the ring gear R2 via the forward clutch 22 and the forward one-way clutch 30 arranged in series with the forward clutch 22 or via the overrunning clutch 24 arranged in parallel to both the forward clutch 22 and the forward one-way clutch 30. The sun gear S2 is connected to the input shaft 13, while the ring gear R1 and the carrier PC2 are constantly connected to the output shaft 14. The low & reverse brake 26 is arranged to hold the carrier PC1 stationary, while the band brake 28 is arranged to hold the sun gear S1 stationary. The low one-way clutch 29 is arranged to allow a rotation of the pinion carrier PC1 in a forward direction (the same direction as a direction which the engine shaft 12 rotates in), but preventing a rotation in the opposite reverse direction.

Figure 2:
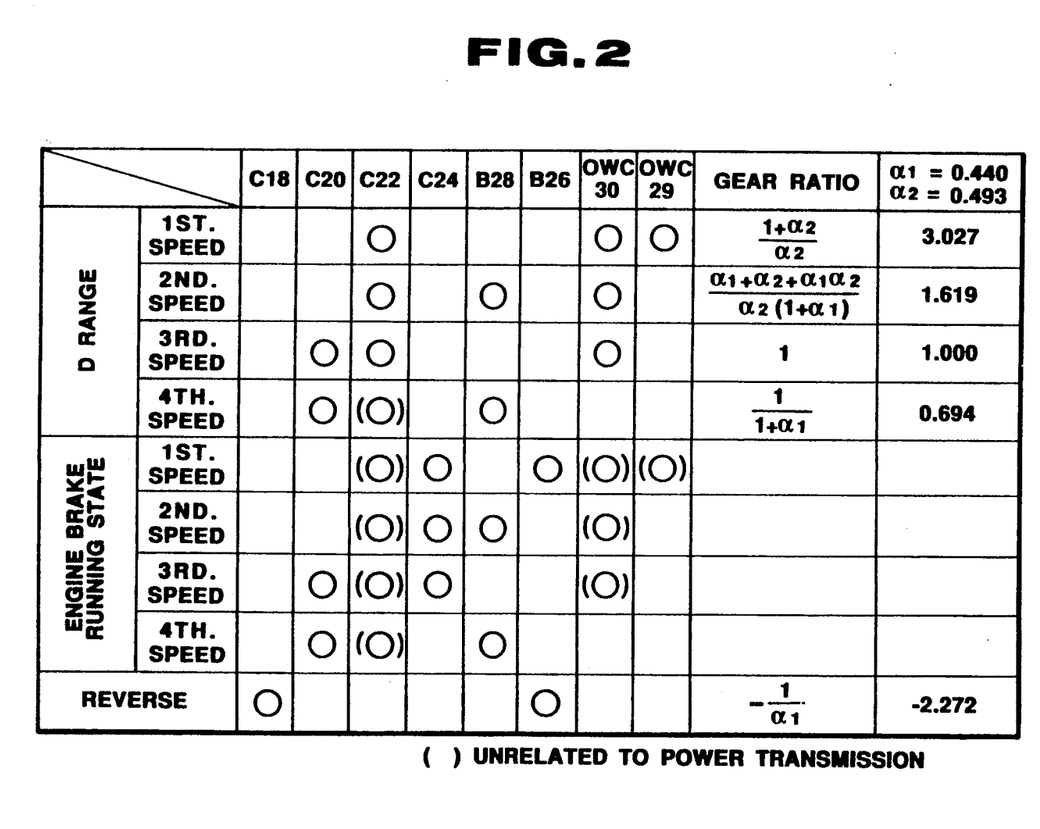
FIG. 2 is a table illustrating which one or ones of the frictionally engageable couplings are actuated in each of the speeds.

In this transmission, rotating states of various rotary elements (S1, S2, R1, R2, PC1, and PC2) of planetary gear sets 15 and 16 are varied by actuating the hydralically actuable and frictionally engageable couplings, namely, the clutches 18, 20, 22, 24, and brakes 26, 28, in different kinds of combination, thereby to vary a ratio, i.e., a gear ratio, of a revolution speed of the input shaft 13 to a revolution speed of the output shaft 14. Four forward speeds and a single reverse speed are provided by actuating the clutches 18, 20, 22, and 24, and the brakes 26 and 28 in various combinations as shown in FIG. 2. In FIG. 2, the sign ◯ (circle) denotes that a particular coupling to which it is assigned is actuated or engaged, the signs $\alpha 1$ (alpha one) and $\alpha 2$ (alpha two) designate a ratio of number of teeth of the ring gear R1 to that of the sun gear S1 and a ratio of number of teeth of the ring gear R2 to that of the sun gear S2.

Figure 3:
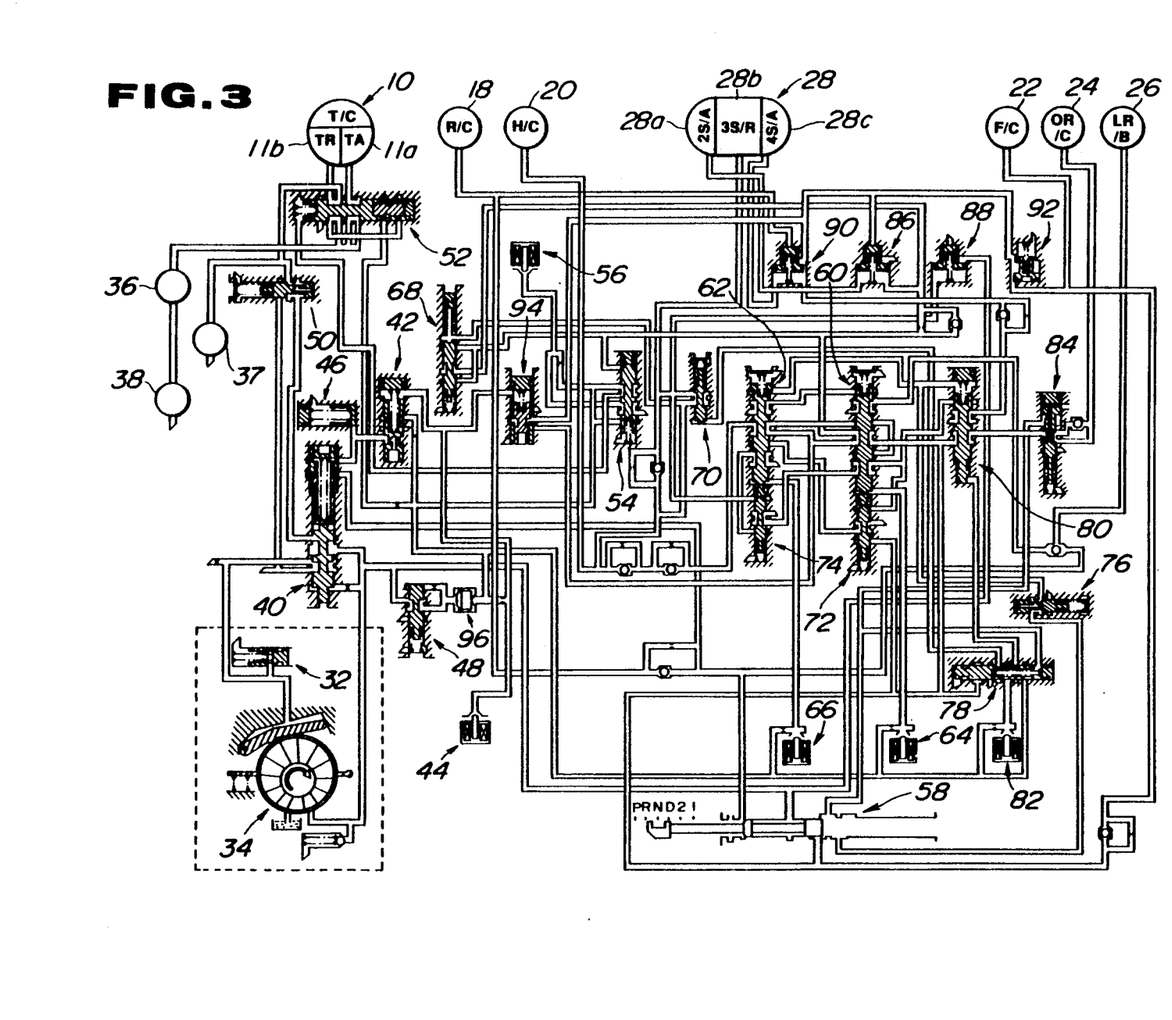
FIG. 3 is a circuit diagram of a hydraulic control system of the automatic transmission.

FIG. 3 shows a hydraulic control system of the transmission. This hydraulic control system comprises a pressure regulator valve 40, a pressure modifier valve 42, a line pressure solenoid 44, a modified pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, and a filter 96. These components are interconnected as illustrated. As illustrated, they are connected also to the before-mentioned torque converter (the torque converter 10 includes an apply chamber 11a and a release chamber 11b for the lock-up clutch 11), the forward clutch 22, the high clutch 20, the band brake 28 (the band brake 28 including a second speed apply chamber 28a, a third speed release chamber 28b, and a fourth speed apply chamber 28c), the reverse clutch 18, the low and reverse brake 26, and the overrunning clutch 24. They are connected also to the variable capacity vane type oil pump 34, the oil cooler 36, the forward lubrication circuit 37, and the rear lubrication circuit 38 as illustrated. The detailed description of these valves is hereby omitted. The automatic transmission thus far briefly described is substantially the same as an automatic transmission of RE4R-01A type which is manufactured by Nissan Motor Company Limited in Japan. The automatic transmission of the RE4R01A type is described in a service manual (publication No. A261C07) entitled "NISSAN FULL RANGE ELECTRONICALLY CONTROLLED AUTOMATIC TRANSMISSION RE4R01A TYPE" published by Nissan Motor Company Limited in March, 1987. U.S. Pat. No. 4,730,521 issued to Hayasaki et al. in Mar. 15, 1989 discloses the automatic transmission of the RE4R01A type. Thus, reference is made to the above-mentioned service manual and the U.S. Pat. No. 4,730,521 for full understanding of the automatic transmission of this type. In this automatic transmission, the magnitude of a line or system pressure is controllable by the line pressure solenoid 44. The manner of controlling the magnitude of the line pressure is described on pages I-22 to I-24 of the above-mentioned service manual. Reference is made to U.S. Pat. No. 4,807,496 issued to Hayasaki et al on Feb. 28, 1989, and especially to its claims, for understanding features of the line pressure control.

Figure 4:
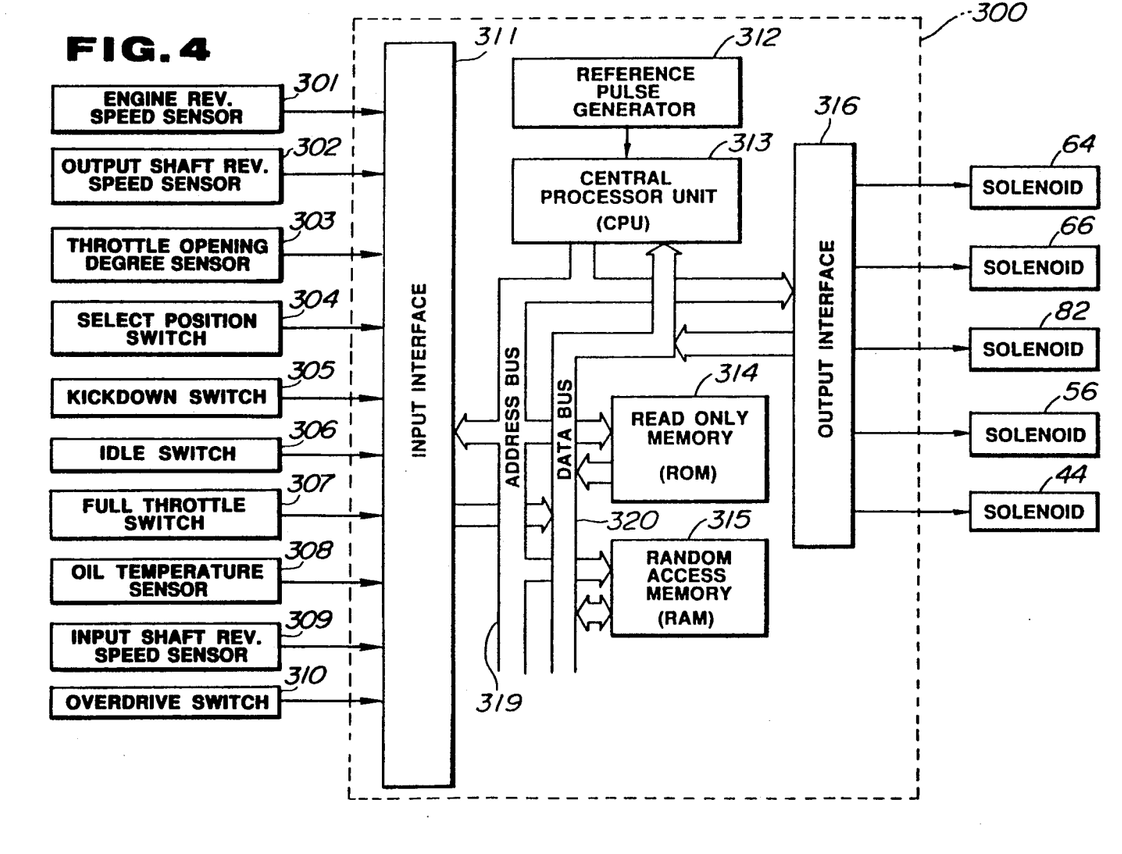
FIG. 4 is a block diagram of an automatic transmission control unit.

FIG. 4 shows an automatic transmission control unit 300 which controls the solenoids 44, 56, 64, 66 and 82. The control unit 300 comprises an input interface 311, a reference pulse generator 312, a CPU (a central processor unit) 313, a ROM (a read only memory) 314, a RAM (a random access memory) 315, and an output interface 316. They are interconnected by an address bus 319, and a data bus 320. Fed to this control unit 300 are output signals of an engine revolution speed sensor 301, an output shaft revolution speed sensor (a vehicle speed sensor) 302, a throttle opening degree sensor 303, a select position switch 304, a kickdown switch 305, an idle switch 306, a full throttle switch 307, an oil temperature sensor 308, an input shaft revolution speed sensor (a turbine revolution speed sensor) 309, and an overdrive switch 310. The output shaft revolution speed sensor 302 detects a revolution speed of the output shaft 14. The input shaft revolution speed sensor 309 detects a revolution speed of the input shaft 13. The outputs of the control unit 300 are supplied to the shift solenoids 64 and 66, overrunning clutch solenoid 82, lock-up solenoid 56, and line pressure solenoid 44.

The shift valves 60 and 62 which are actuable by the corresponding shift solenoids 64 and 66, and pressure modifier valve 42 which is actuable by the line pressure solenoid 44 are controlled by the automatic transmission control unit 300.

Reference is made to pages I-22 to I-27 of the service manual (publication No. A261C07) and to the U.S. Pat. No. 4,730,521 for explanation of actuation of the solenoids 44, 64 and 66, and valves 42, 60 and 62. The necessary control functions are performed in the control unit 300.

The manner of the line pressure control is explained below in principle with reference to the signal and pressure diagram shown in FIG. 7 and the line pressure diagram shown in FIG. 6.

Figure 6:
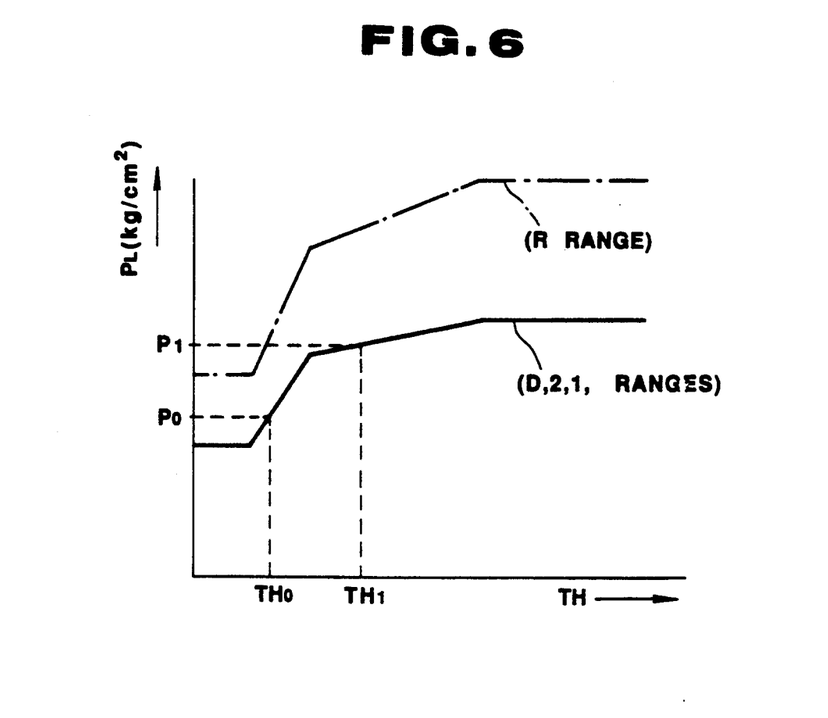
FIG. 6 is a line pressure diagram.

Referring to FIG. 6, the fully drawn line shows a predetermined pattern of variation of a line pressure ($P_L$) versus an engine load indicative signal, i.e., a throttle opening degree indicative signal (TH), when the manual lever is placed at a D or 2 or 1 range, and one dot chain line a predetermined pattern of variation of the line pressure when the manual lever is placed at a R range. In FIG. 6, the line pressure is increased to a level $P_0$ with the throttle opening degree at a value $TH_0$ and then to a higher level $P_1$ with the throttle opening degree at a greater value $TH_1$.

Figure 7:
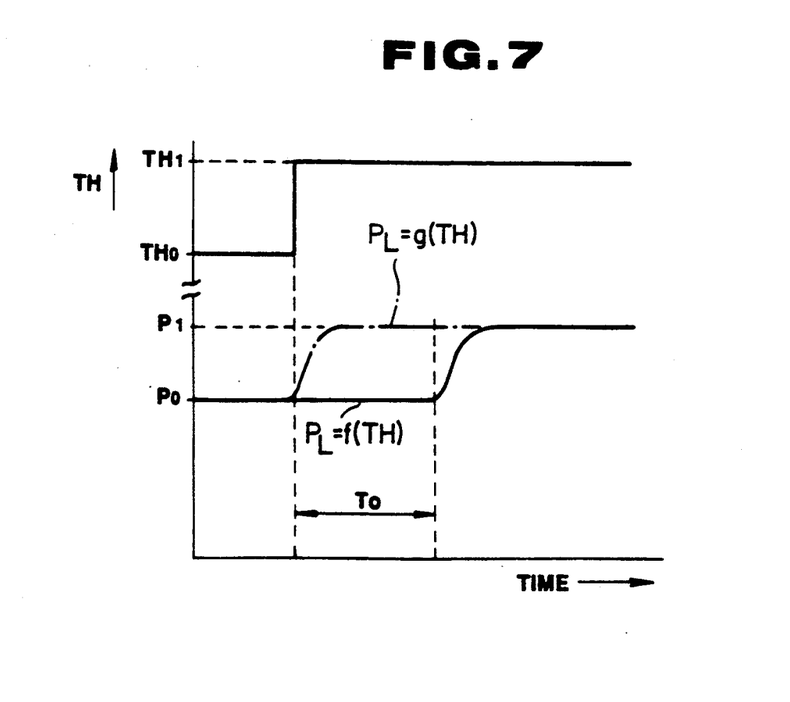
FIG. 7 is a signal and pressure diagram for explaining the manner of operation.

At the top of FIG. 7 is shown a change, from $TH_0$ to $TH_1$, in throttle opening degree beyond a predetermined value. Upon or after occurrence of this change, the line pressure supplied to the hydraulically actuable coupling remains invariable for a period of time $T_0$ and thereafter increases to the level $P_1$ from the previous level $P_0$. In other words, the predetermined pattern of variation of the line pressure $P_L$ is changed to a second pattern upon or after occurrence of the change in the throttle opening degree beyond the predetermined degree and the line pressure is caused to follow this second pattern for the period of time $T_0$. In FIG. 7, the one dot chain line curve illustrates a change in the line pressure according to the prior art. Although, in this example, the magnitude of the line pressure during the period of time $T_0$ remains invariable, the magnitude of the line pressure during this period of time $T_0$ may be variable with a vehicle operating parameter, such as one of or a combination of an engine revolution speed, an output shaft revolution speed of the automatic transmission, a throttle opening degree ($TH_0$, for example) prior to the change, and a throttle opening degree $TH_1$, for example) after the change. Similarly, the period of time ($T_0$) may be variable with such a vehicle operating parameter.

Figure 5:
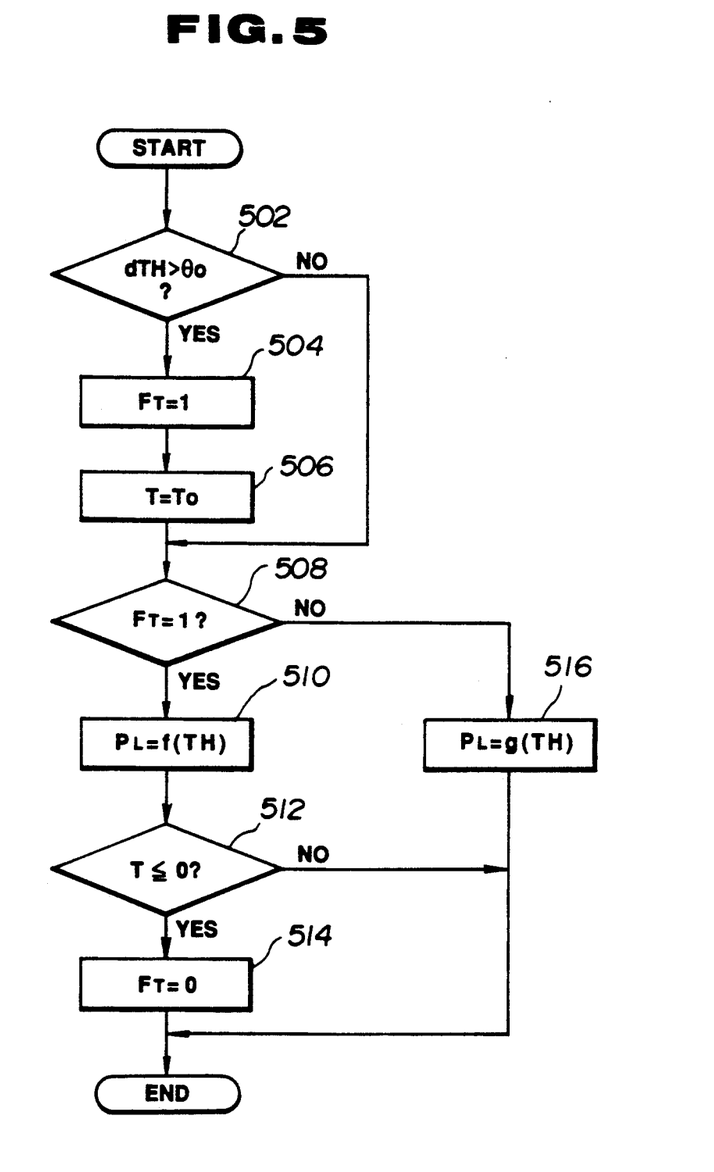
FIG. 5 a flow diagram for explaining the sequence of necessary operating steps.

The flow diagram shown in FIG. 5 shows an example of a routine for the control explained with reference to FIG. 7.

In FIG. 5, there is an interrogation at 502 whether a change in throttle opening degree data TH, i.e., a time derivative of TH, is greater than a predetermined value $\theta_0$ or not. If this is the case, a flag $F_T$ is set at a block 504, and a timer T is set equal to a predetermined period of time $T_0$ at a block 506. Following this block 506, there is another interrogation at 508 whether the flag $F_T$ is set or not. Initially this is the case and thus the routine proceeds to a block 510 where a line pressure $P_L$ is determined in accordance with a pattern which may be expressed as a characteristic f(TH). The line pressure $P_L$ determined at the block 510 is set in each of the subsequent runs of this routine until the period of time $T_0$ has elapsed. The termination of the period of time is recognized by an interrogation at 512. After the period of time $T_0$ has elapsed, the routine proceeds from the interrogation 512 to a block 514 where the flag $F_T$ is cleared. In the subsequent run after the flag $F_T$ has been cleared, the routine proceeds along 502, 508 and 516. At the block 516, the line pressure $P_L$ is determined in accordance with a predetermined pattern as expressed by a characteristic g(TH). This characteristic g(TH) is illustrated by the fully drawn line in FIG. 6. Although not specifically illustrated in the flow diagram shown in FIG. 5, the line pressure $P_L$ determined at the block 510 or 516 is converted into OFF duty percentage of the line pressure solenoid 44.

In the preceding description, the characteristic f(TH) provides a lower line pressure value than the characteristic g(TH) does. Thus, the magnitude of the line pressure after occurrence of the change in throttle opening degree beyond the predetermined value is restrained from increasing in accordance with the characteristic g(TH). This tendency is held for the period of time $T_0$. This period of time is set taking into account a delay in a change in actual engine torque after a change in throttle opening degree. Therefore, the variation in the line pressure is now tailored well with actual variation in engine torque. As a result, a shockless shifting in the automatic transmission is provided.

What is claimed is:

1. A system for controlling an automatic transmission of an automotive vehicle having an engine with a throttle valve which opens in degrees, wherein the automatic transmission is drivingly coupled with the engine and transmits the engine torque by a hydraulically actuable torque transmitting coupling which is hydraulically actuable by hydraulic fluid under a line pressure, the system comprising:
   throttle opening degree sensor means for detecting an opening degree of the throttle valve and generating a throttle opening degree indicative signal indicative of said detected opening degree;
   a control unit coupled with said throttle opening degree sensor means, said control unit including:
   means for repeatedly comparing whether a first time of derivations of opening degree of the throttle valve is greater than a predetermined value or not and generating a comparison result signal when said change is greater than said predetermined value;
   means for determining a value which the line pressure is to take in accordance with a first predetermined characteristic with respect to an opening degree of the throttle valve until said comparison result signal is generated;
   means for determining a value which the line pressure is to take in accordance with a second predetermined characteristic upon generation of said comparison result indicative signal, said second predetermined characteristic being different from said first predetermined characteristic;
   means for determining a value which the line pressure is to take in accordance with said second predetermined characteristic until expiration of a predetermined period of time initiated by generation of said comparison result signal; and
   means for determining a value which the line pressure is to take in accordance with said first predetermined characteristic upon expiration of said predetermined period of time under a condition where said comparison result is absent; and
   means for setting the line pressure at said determined value which the line pressure is to take.

2. A system as claimed in claim 1, wherein said second predetermined characteristic provides a lower value in the line pressure than said first predetermined characteristic does against the same opening degree of the throttle valve.

3. A method of controlling an automatic transmission of an automotive vehicle having an engine with a throttle valve which opens in degrees, wherein the automatic transmission is drivingly coupled with the engine and transmits the engine torque by a hydraulically actuable torque transmitting coupling which is hydraulically actuable by hydraulic fluid under a line pressure, the method comprising the steps of:
   repeatedly comparing whether a first time derivative of opening degree of the throttle valve is greater than a predetermined value or not and generating a comparison result signal when said change is greater than said predetermined value;
   determining the line pressure in accordance with a first predetermined characteristic with respect to an opening degree of the throttle valve until said comparison result signal is generated;
   determining the line pressure in accordance with a second predetermined characteristic upon generation of said comparison result indicative signal, said second predetermined characteristic being different from said first predetermined characteristic;

determining the line pressure in accordance with said second predetermined characteristic until expiration of a predetermined period of time initiated by generation of said comparison result signal; and determining the line pressure in accordance with said first predetermined characteristic upon expiration of said predetermined period of time under a condition where said comparison result is absent.

4. A method as claimed in claim 3, wherein said second predetermined characteristic provides the line pressure which remains invariable with respect to a varying opening degree of the throttle valve.

5. A method as claimed in claim 4, wherein said second predetermined characteristic provides the line pressure variable with a vehicle operating parameter.

6. A method as claimed in claim 3, wherein said second predetermined characteristic provides a lower value in the line pressure than said first predetermined characteristic does against the same opening degree of the throttle valve.

* * * * *